(12) United States Patent
Jacob et al.

(10) Patent No.: US 10,585,219 B2
(45) Date of Patent: Mar. 10, 2020

(54) GRATING COUPLERS WITH MULTIPLE CONFIGURATIONS

(71) Applicant: GLOBALFOUNDRIES INC., Grand Cayman (KY)

(72) Inventors: Ajey Poovannummoottil Jacob, Watervliet, NY (US); Yusheng Bian, Ballston Lake, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/000,249

(22) Filed: Jun. 5, 2018

(65) Prior Publication Data
US 2019/0369309 A1 Dec. 5, 2019

(51) Int. Cl.
| | |
|---|---|
| G02B 6/34 | (2006.01) |
| G02B 5/18 | (2006.01) |
| G02B 6/42 | (2006.01) |
| G02B 6/12 | (2006.01) |
| G02B 6/293 | (2006.01) |
| G02B 6/124 | (2006.01) |

(52) U.S. Cl.
CPC ......... *G02B 5/1847* (2013.01); *G02B 6/124* (2013.01); *G02B 6/12007* (2013.01); *G02B 6/2938* (2013.01); *G02B 6/34* (2013.01); *G02B 6/4214* (2013.01)

(58) Field of Classification Search
CPC .... G02B 5/1847; G02B 6/124; G02B 6/2938; G02B 6/4214; G02B 6/34; G02B 6/12007
See application file for complete search history.

(56) References Cited

U.S. PATENT DOCUMENTS

| | | | |
|---|---|---|---|
| 4,915,463 A | 4/1990 | Barbee, Jr. | |
| 5,033,812 A | 7/1991 | Yoshida et al. | |
| 2002/0191916 A1 | 12/2002 | Frish et al. | |
| 2004/0156589 A1 | 8/2004 | Gunn, III et al. | |
| 2007/0086703 A1 | 4/2007 | Kirk et al. | |
| 2010/0150500 A1* | 6/2010 | Pyo | G02B 6/12004 385/37 |
| 2011/0133063 A1* | 6/2011 | Ji | G02B 6/122 250/227.24 |
| 2016/0091664 A1* | 3/2016 | Doany | G02B 6/34 385/37 |

(Continued)

OTHER PUBLICATIONS

Sodagar et al., "High-efficiency and wideband interlayer grating couplers in multilayer Si/SiO2/SiN platform for 3D integration of optical functionalities", Optics Express, vol. 22, No. 14, Jul. 1, 2014, 11 pages.

(Continued)

*Primary Examiner* — Ellen E Kim
(74) *Attorney, Agent, or Firm* — David Cain; Andrew M. Calderon; Roberts Mlotkowski Safran Cole & Calderon, P.C.

(57) ABSTRACT

The present disclosure relates to semiconductor structures and, more particularly, to grating couplers with multiple configurations and methods of manufacture. A grating coupler structure includes: a polysilicon material with a first grating coupling pattern; a SiN material with second grating coupling pattern; a dielectric material covering the polysilicon material and the SiN material; and a back end of line (BEOL) multilayer stack over the dielectric material.

20 Claims, 3 Drawing Sheets

(56) References Cited

U.S. PATENT DOCUMENTS

| | | | |
|---|---|---|---|
| 2017/0047312 A1 | 2/2017 | Budd et al. | |
| 2017/0115456 A1* | 4/2017 | Sugama | G02B 6/34 |
| 2017/0315420 A1* | 11/2017 | Watts | G02B 6/1223 |
| 2018/0274977 A1* | 9/2018 | Baik | F21V 7/22 |
| 2018/0308754 A1* | 10/2018 | Guler | H01L 21/76816 |

OTHER PUBLICATIONS

Hitz, "Gratings Couple Optical Fibers to Silicon Photonic Devices", Photonics Spectra, Nov. 2005, 3 pages.

Sacher et al., "Wide bandwidth and high coupling efficiency Si3N4-on-SOI dual-level grating coupler", Optics Express, vol. 22, Issue 9, Apr. 29, 2014, 10 pages.

Kuno et al., "Design of apodized hydrogenated amorphous silicon grating couplers with metal mirrors for inter-layer signal coupling: Toward three-dimensional optical interconnection", The Japan Society of Applied Physics, Mar. 12, 2015, 7 pages.

* cited by examiner

GRATING COUPLERS WITH MULTIPLE CONFIGURATIONS

FIELD OF THE INVENTION

The present disclosure relates to semiconductor structures and, more particularly, to grating couplers with multiple configurations and methods of manufacture.

BACKGROUND

Grating couplers are commonly used in integrated optics for coupling light between integrated on-chip photonic waveguide structures and optical fibers. The grating couplers can couple light to and from the chip at any location, but the bandwidth can be limited due to the dispersive operating principle of the grating couplers.

Grating couplers can be formed in many different ways. For example, grating couplers can having a single-layer SiN top cladding (for products) or without the SiN cladding (used for wafer-level testing). Grating couplers with nitride top cladding suffer from limited coupling efficiency due to the additional reflection induced by the nitride cladding. The non-optimized top SiN top cladding will dramatically reduce the overall coupling efficiency of the photonic device.

SUMMARY

In an aspect of the disclosure, a grating coupler structure comprises: a polysilicon material with a first grating coupling pattern; a SiN material with second grating coupling pattern; a dielectric material covering the polysilicon material and the SiN material; and a back end of line (BEOL) multilayer stack over the dielectric material.

In an aspect of the disclosure, a grating coupler structure comprises: a semiconductor material; a polysilicon material embedded in dielectric material over the semiconductor material and having a first grating coupler pattern; a SiN material embedded in the dielectric material and located over the polysilicon material, the SiN material having a second grating coupler pattern which directs light through the first gating coupler pattern of the polysilicon material; and a back end of line (BEOL) multilayer stack over the dielectric material.

In an aspect of the disclosure, a method comprises: forming a polysilicon material having a grating coupler pattern; forming an SiN material over the polysilicon material and having a grating coupler pattern which directs light through the gating coupler pattern of the polysilicon material; and forming a back end of line (BEOL) multilayer stack over the SiN material.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to grating couplers with multiple configurations and methods of manufacture. More specifically, the grating couplers are hetero-grating couplers which include different multilayer configurations to enhance the coupling and/or reflection of light into a waveguide structure. That is, the grating couplers can include different configurations of an Rx layer, polysilicon material and SiN material to create destructive and/or constructive interference to improve efficiency of the grating couplers. Advantageously, by using the grating couplers described herein it is now possible to provide high-efficiency tunable grating couplers, i.e., improved efficiency of grating couplers (e.g., polysilicon, KG, nitride-based, etc. devices), for amongst other devices, Si photonics technologies and other photonics technologies involving grating couplers.

In embodiments, the grating couplers described herein are multi-layer hetero-grating couplers comprising SiN material below a BEOL stack of materials, in addition to lined polysilicon material. In embodiments, the SiN material, the lined polysilicon material and the underlying Rx layer can be patterned into different configurations to provide improved grating coupling. These patterns can include SiN material and/or polysilicon material with periodic/non-periodic gratings, e.g., patterned configurations, that minimize the reflection at the targeted wavelength range. By integrating the SiN material with the polysilicon material and the underlying Rx layer (e.g., semiconductor layer), it is possible to couple and confine more light energy into and out of the Si photonic waveguides of the grating coupler. This leads to improved coupling efficiency and reduced loss, which is important for current technologies.

The grating couplers of the present disclosure can be manufactured in a number of ways using a number of different tools. In general, though, the methodologies and tools are used to form structures with dimensions in the micrometer and nanometer scale. The methodologies, i.e., technologies, employed to manufacture the grating couplers of the present disclosure have been adopted from integrated circuit (IC) technology. For example, the structures are built on wafers and are realized in films of material patterned by photolithographic processes on the top of a wafer. In particular, the fabrication of the grating couplers uses three basic building blocks: (i) deposition of thin films of material on a substrate, (ii) applying a patterned mask on top of the films by photolithographic imaging, and (iii) etching the films selectively to the mask.

Figure 1:
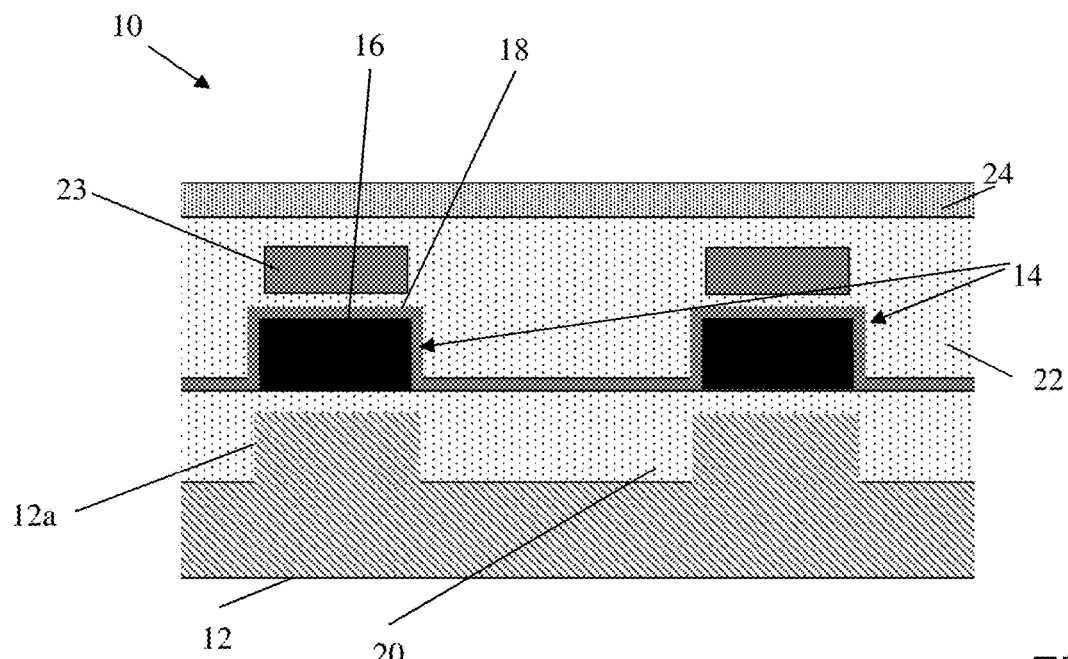
FIG. 1 shows a grating coupler with SiN material and a patterned semiconductor material, amongst other features, and respective fabrication processes in accordance with aspects of the present disclosure.

FIG. 1 shows a structure with a grating coupler and cladding in accordance with aspects of the present disclosure. More specifically, the structure 10 of FIG. 1 is composed of a patterned semiconductor slab 12 located below a grating coupler 14. The semiconductor slab 12 can be Si;

although other semiconductor materials are also contemplated herein. For example, the semiconductor slab 12 can be composed of, but not limited to, Si, SiGe, SiGeC, SiC, GaAs, InAs, InP, and other III/V or II/VI compound semiconductors. The semiconductor slab 12 can also be part of a silicon on insulator (SOI) wafer, with each of the embodiments described herein including CMOS electronic components formed on or below the semiconductor slab 12 (or above the SOI wafer).

The semiconductor slab 12 can be patterned by conventional lithography and etching methods known to those of skill in the art. For example, and referring to the patterning of the semiconductor slab 12, a resist formed over the semiconductor slab 12 is exposed to energy (light) to form a pattern (opening). An etching process with a selective chemistry, e.g., reactive ion etching (RIE), will be used to form one or more trenches partly within the semiconductor slab 12, e.g., to a certain desired depth, through the openings of the resist. The resist can then be removed by a conventional oxygen ashing process or other known stripants. In embodiments, the pattern 12a of the semiconductor slab 12 is aligned with the grating coupler 14; although other configurations are also contemplated herein.

The grating coupler 14 is composed of a patterned polysilicon material 16, lined with a SiN material 18, in addition to a patterned SiN material 23 (e.g., SiN mesas 23). The added SiN material naturally integrates with CMOS technology and other current technology platforms. In embodiments, the SiN material 23 of the grating coupler 14 can have a thickness in the range of about 100 nm to 3 µm. It should be recognized, though, that the thicknesses of the layers, e.g., SiN material, can be different, with the values preferably falling within the above-noted range depending on the particular constructive or destructive interference required for a specific wavelength of light.

The polysilicon material 16 and SiN material (mesas) 23 can be patterned by conventional lithography and etching methods known to those of skill in the art. For example, following resist removal over the patterned semiconductor slab 12, a dielectric material 20, e.g., oxide, is deposited on the patterned semiconductor slab 12. In embodiments, the dielectric material 20 can be deposited by a conventional deposition method, e.g., chemical vapor deposition (CVD) process. The polysilicon material 16 of the grating coupler 14 is then deposited over the dielectric material 20, e.g., using CVD processes, followed by the patterning process as described above to form independent and distinct mesas (islands). Following the patterning of the polysilicon material 16, it is lined by SiN material 18 deposited using conventional deposition methods, e.g., CVD.

Still referring to FIG. 1, a dielectric material 22 is deposited over the SiN material 18. A SiN material is then deposited over the dielectric material 22, e.g., using CVD processes, followed by the patterning process to form SiN mesas 23. In embodiments, the patterned SiN material (SiN mesas) 23 and patterned polysilicon material (poly mesas) 16 can be alignment with one another or provided in an offset configuration or other periodic or non-periodic pattern, depending on the desired characteristics. Following the patterning of the SiN material 23, additional dielectric material 22 is deposited over the patterned SiN material 23, e.g., using CVD processes. A back end of line (BEOL) multilayer stack 24 is formed over the dielectric material 22. The BEOL stack 24 can include any back end of line structures, e.g., wiring structures, interconnects, etc.

Figure 2:
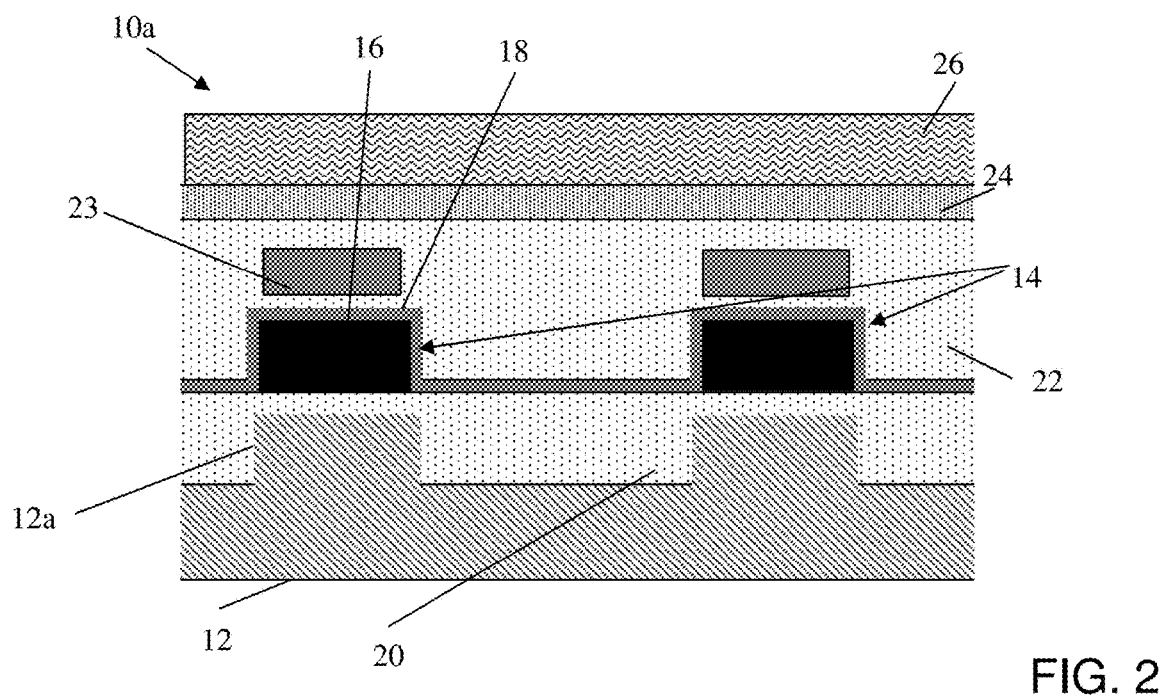
FIG. 2 shows the structure of FIG. 1 with a cladding layer, amongst other features, and respective fabrication processes in accordance with additional aspects of the present disclosure.

FIG. 2 shows the structure of FIG. 1 with a cladding layer, amongst other features. More specifically, in the structure 10a of FIG. 2, a cladding layer 26 of SiN material is formed on the BEOL stack 24. In embodiments, the cladding layer 26 can include one or more layers of patterned or non-patterned SiN material to minimize the reflection at the targeted wavelength range and, hence, optimize the efficiency of the grating couplers. As should be understood by those of skill in the art, in operation, light from a fiber optic will be emitted through the cladding layer 26, BEOL stack 24, grating coupler 14 and semiconductor slab 12 into a waveguide structure (not shown).

Figure 3:
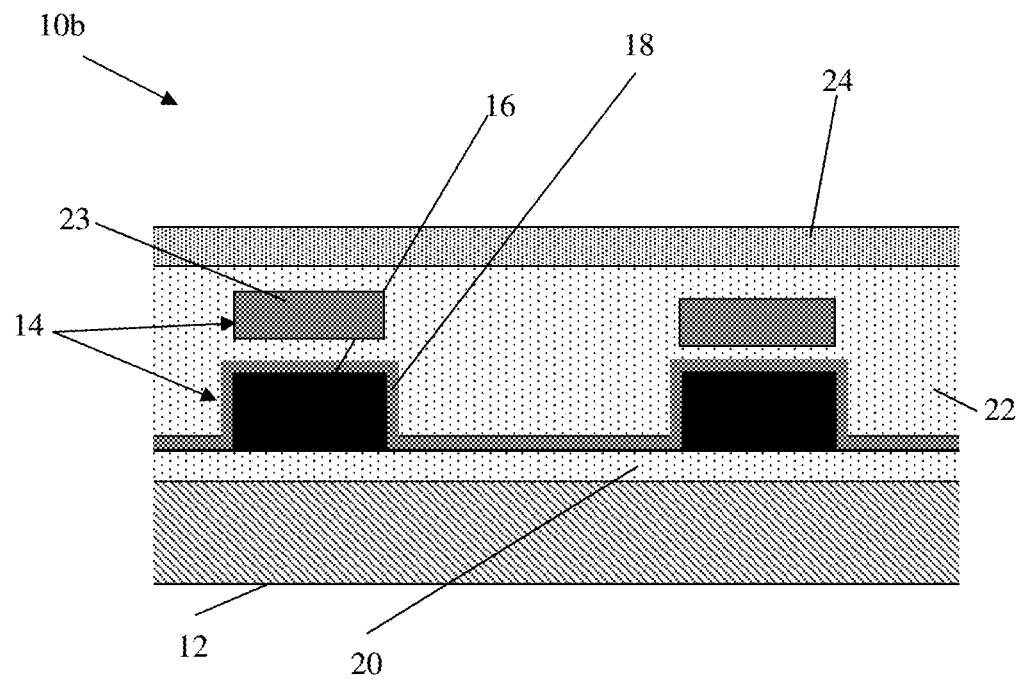
FIG. 3 shows a grating coupler with SiN material and a non-patterned semiconductor material, amongst other features, and respective fabrication processes in accordance with aspects of the present disclosure.

FIG. 3 shows a grating coupler with SiN material and a non-patterned semiconductor slab (Rx layer), amongst other features. More specifically, in the structure 10b of FIG. 3, the semiconductor slab (Rx layer) 12 is a monolithic slab (e.g., not patterned) with a planar or substantially planar surface. The remaining features of FIG. 3, e.g., grating coupler 14 and BEOL multilayer stack 24, are the same as shown in FIG. 1 such that no further explanation is required for an understanding of the present disclosure.

Figure 4:
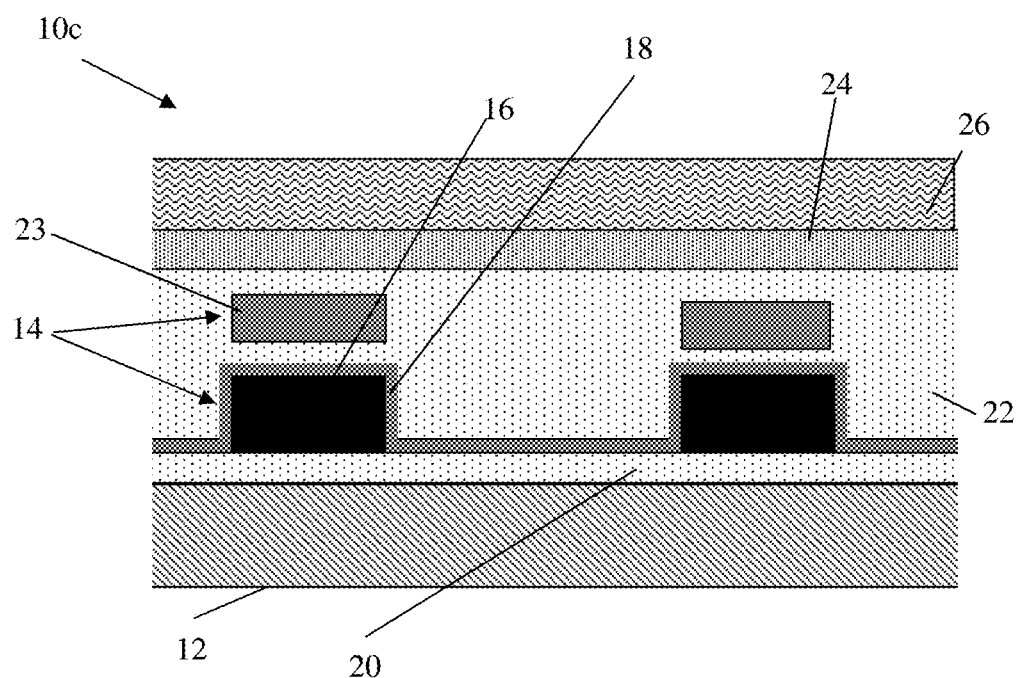
FIG. 4 shows the structure of FIG. 3 with a cladding layer, amongst other features, and respective fabrication processes in accordance with additional aspects of the present disclosure.

FIG. 4 shows the structure of FIG. 3 with a cladding layer 26. More specifically, in the structure 10c of FIG. 4, the cladding layer 26 is deposited on the BEOL layer 24. In embodiments, the cladding layer 26 can include one or more layers of patterned or non-patterned SiN material as described with respect to FIG. 2.

FIGS. 5A-5D show different configurations of the grating couplers which can be used in any combination of the structures of FIGS. 1-4. Specifically, in FIG. 5A, the grating coupler 14 includes a partially etched polysilicon material 16a (e.g., such that the polysilicon material does not form separate poly mesas). The SiN material liner material (e.g., SiN material 18) is deposited over the partially patterned polysilicon material 16a. The SiN material 23 of the grating coupler 14 is deposited over the polysilicon material 16a with liner material 18. In embodiments, the polysilicon material 16a and the SiN material 23 can patterned to have repetitive, periodic grating pattern aligned with one another. For example, the dimensions of the spaces (groove) 112 can be about 300 nm to 20 µm, with the pitch or period "x" being about 400 nm to 40 µm.

Figure 5A:
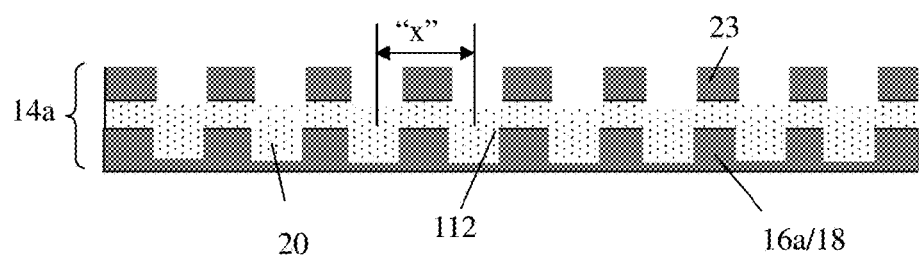
FIGS. 5A-5D show different configurations of a grating coupler used with any of the structures of FIGS. 1-4 and respective fabrication processes in accordance with aspects of the present disclosure.
Figure 5B:
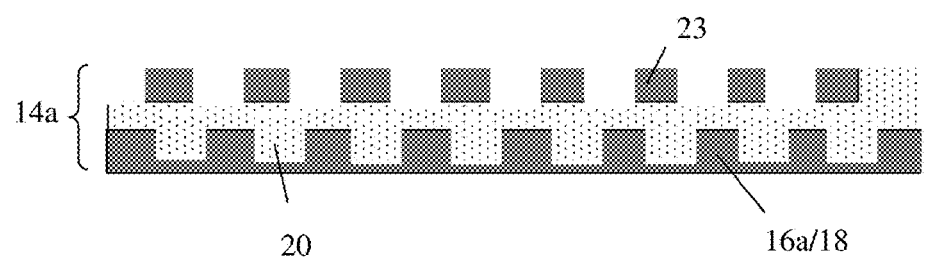

As shown in FIG. 5B, the patterned SiN material 23 can be offset with respect to the patterns of the polysilicon material 16a. For example, the patterned SiN material (mesas) 23 can have a different pitch (dimension) than the patterned polysilicon material. For example, as shown in FIG. 5B, after partially etching the polysilicon material 16a, the SiN material 23 of the grating coupler 14 is patterned to have a pattern that is offset with respect to the patterned polysilicon material (mesas) 16a. In embodiments, the patterned SiN material 23 can also be provided in an offset pattern to a patterned fully etched polysilicon material. Accordingly, in embodiments, the patterned SiN material (mesas) 23 can have a different pitch (dimension) than the patterned polysilicon material 16a; although the present disclosure also contemplates a different duty cycle and/or position with respect to the patterned polysilicon material 16a. For example, the SiN material can have a pitch of 480 nm and a duty cycle of 0.25; whereas the polysilicon material can have a pitch of 480 nm and a duty cycle of 0.5. This configuration, for example, can provide a 9.6% improvement in transmission compared to the use of a grating coupler of polysilicon alone.

Figure 5C:
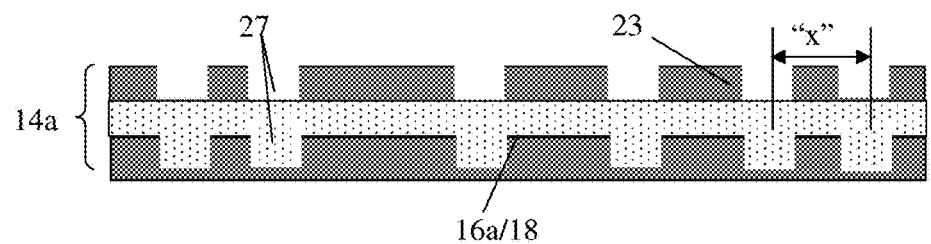

In FIG. 5C, the patterned polysilicon material 16a and the patterned SiN material 23 can each have a repetitive, periodic grating pattern. For example, the dimensions of the spaces (groove) 27 can be about 300 nm to 20 µm, with the pitch or period "x" being about 400 nm to 40 µm. In embodiments, the patterned materials 16a, 23 can either be aligned or offset (e.g., a period of the patterned layers 16a, 23a can be the same or different (as shown, e.g., in FIG. 5B)), depending on the particular constructive or destructive interference required for a specific wavelength of light.

Figure 5D:
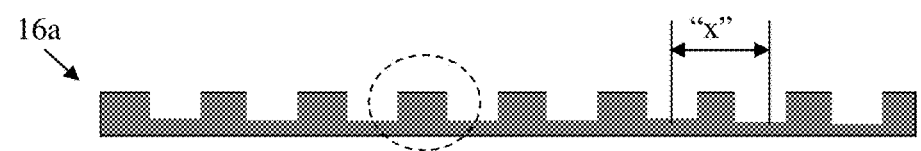
Figure 5D:
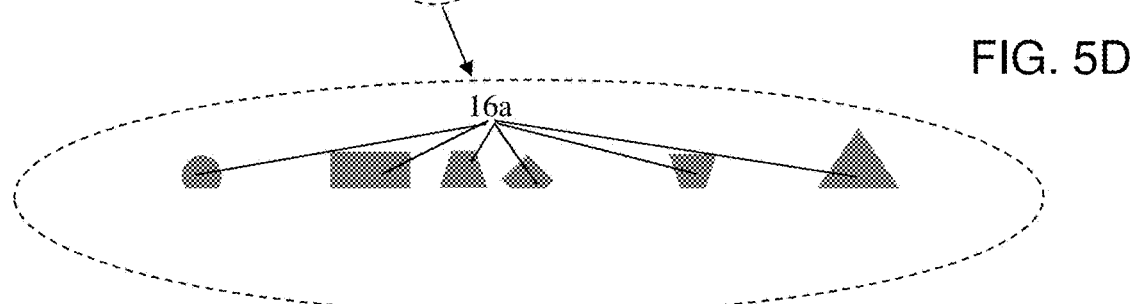

In FIG. 5D, the patterned polysilicon material 16a of the grating coupler 14 can include many different shapes. For example, the different shapes of the patterned polysilicon material 16 can include, e.g., trapezoid, inverse trapezoidal, triangle, semispherical, diamond, parallelogram, square, etc., as shown in the exploded inset of FIG. 5D.

It is also contemplated herein that any combination of the features of FIGS. 5A-5D can be combined together. For example, the pitches of the polysilicon material 16a of the grating coupler 14 and the SiN material of the grating coupler can be different, with one of them being apodized or provided at a non-regular periodic pattern and the other at a repetitive, periodic grating pattern.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A grating coupler structure, comprising:
a semiconductor substrate;
an insulator material directly contacting a top surface of the semiconductor substrate;
a polysilicon material with a first grating coupling pattern directly contacting the insulator material;
a lining material which is directly contacting and lining exposed surfaces of the polysilicon material and the insulator material;
a SiN material with a second grating coupling pattern located above the polysilicon material and the lining material;
a dielectric material directly covering the lining material over the polysilicon material and completely surrounding the SiN material; and
wiring or interconnect structures over the dielectric material,
wherein the first grating coupling pattern and the second grating coupling pattern are a same pattern.

2. The grating coupler structure of claim 1, wherein the semiconductor substrate is below the first grating coupling pattern of the polysilicon material and the second grating coupling pattern of the SiN material.

3. The grating coupler structure of claim 2, wherein the semiconductor substrate has a grating coupling pattern aligned with the first grating coupling pattern and the second grating coupler pattern.

4. The grating coupler structure of claim 3, further comprising a SiN cladding layer directly over the wiring or interconnect structures.

5. The grating coupler structure of claim 2, wherein the semiconductor substrate is a slab of non-patterned material and further comprising a cladding structure directly on the wiring or interconnect structures.

6. The grating coupler structure of claim 1, wherein the first grating coupling pattern of the polysilicon material are polysilicon mesas.

7. The grating coupler structure of claim 1, wherein the first grating coupling pattern of the polysilicon material is a partial etch through of the polysilicon material.

8. The grating coupler structure of claim 1, wherein the second grating coupling pattern of the SiN material has a periodic grating pattern.

9. The grating coupler structure of claim 1, wherein the second grating coupling pattern of the SiN material has a non-periodic grating pattern.

10. The grating coupler structure of claim 1, wherein the first grating coupling pattern of the polysilicon material is aligned with the second grating coupling pattern of the SiN material.

11. The grating coupler structure of claim 1, wherein the first grating coupling pattern of the polysilicon material is offset with the second grating coupling pattern of the SiN material.

12. The grating coupler structure of claim 1, wherein the first grating coupling pattern of the polysilicon material includes one of the following shapes: square, trapezoid, inverse trapezoidal, diamond, semi-spherical, and parallelogram.

13. A grating coupler structure, comprising:
a semiconductor material;
a dielectric material directly contacting a top surface of the semiconductor material;
a polysilicon material directly contacting the dielectric material and completely embedded in additional dielectric material which is over the semiconductor material and the dielectric material, and the polysilicon material having a first grating coupler pattern;
a SiN lining material directly contacting and lining the polysilicon material and exposed surfaces of the dielectric material;
a SiN material entirely embedded in and contacting the additional dielectric material such that the SiN material is completely surrounded by and in direct contact with the additional dielectric material, and the SiN material is further located over the polysilicon material and the SiN liner, and separated from the polysilicon material by the additional dielectric material and the SiN liner such that the additional dielectric material and the SiN liner is between the SiN material and the polysilicon material, and the SiN material having a second grating coupler pattern which directs light through the first gating coupler pattern of the polysilicon material; and wiring or interconnect structures over the additional dielectric material.

14. The grating coupler structure of claim 13, wherein the semiconductor material includes a grating coupler pattern.

15. The grating coupler structure of claim 13, wherein the SiN material has one of a periodic and non-periodic grating pattern.

16. The grating coupler structure of claim 15, wherein the polysilicon material has one of a periodic and non-periodic grating pattern.

17. The grating coupler structure of claim 13, wherein the second grating coupler pattern of the SiN material is a same pattern and aligned with the first grating coupler pattern of the polysilicon material and the SiN liner is directly contacting and over both the polysilicon material and the underlying dielectric material such that SiN liner is an intervening layer between the additional dielectric material and the polysilicon material, wherein the dielectric material, the SiN liner and the additional dielectric material are different, distinct layers.

18. The grating coupler structure of claim 13, wherein the first grating coupling pattern of the polysilicon material includes one of the following shapes: square, trapezoid, inverse trapezoidal, diamond, semi-spherical, and parallelogram.

19. A method comprising:
forming an insulator material directly contacting a top surface of a semiconductor substrate;
forming a polysilicon material having a grating coupler pattern directly on the insulator material;
forming a liner material directly over and contacting the polysilicon material and exposed portions of the insulator material;
forming additional insulator material directly on the liner material;
forming an SiN material over the polysilicon material and the liner material, which has a grating coupler pattern which directs light through the gating coupler pattern of the polysilicon material; and
embedding the SiN material with additional dielectric material directly covering the liner material, polysilicon material and surrounding the SiN material;
forming-wiring or interconnect structures over the SiN material and the dielectric material.

20. The grating coupler structure of claim 1, wherein the lining material is an SiN liner directly on a surface and lining the polysilicon material and the insulator material, wherein the polysilicon material is directly on the insulator material and the SiN material is surrounded by the dielectric material including between the SiN material and the SiN liner.

* * * * *